United States Patent

[11] 3,598,996

| [72] | Inventors | Dietrich V. Haebler;<br>Gunther Jahn, both of Erlangen, Germany |
|---|---|---|
| [21] | Appl. No. | 706,262 |
| [22] | Filed | Feb. 19, 1968 |
| [45] | Patented | Aug. 10, 1971 |
| [73] | Assignee | Siemens Aktiengesellschaft<br>Erlangen, Germany |
| [32] | Priority | Mar. 11, 1967 |
| [33] | | Germany |
| [31] | | S 1 08 775 |

[54] APPARATUS FOR MEASURING AND EVALUATING THE ACTIVITY OF MEASURING PROBES IRRADIATED IN A NUCLEAR REACTOR
6 Claims, 3 Drawing Figs.

[52] U.S. Cl. ....................................................... 250/83.3,
                                                              176/19
[51] Int. Cl. ....................................................... G01t 1/16
[50] Field of Search............................................. 176/19, 19
                                               LD; 250/83.1, 83.6, 83.3

[56] References Cited
UNITED STATES PATENTS

| 2,768,134 | 10/1956 | Fermi et al. | 250/83.1 |
| 3,073,979 | 1/1963 | Jervis | 250/83.1 |
| 3,145,148 | 8/1964 | Campbell | 176/19 LD |
| 3,207,668 | 9/1965 | West | 176/19 LD |
| 3,237,009 | 2/1966 | Warman et al. | 250/83.1 |

OTHER REFERENCES
Nuclear Power Dec. 1958 p. 602

Primary Examiner—Reuben Epstein
Attorneys—Curt M. Avery, Arthur E. Wilfond, Herbert L. Lerner and Daniel J. Tick ABSTRACT: A plurality of measuring probes are sequentially positioned in a conveyor tube in the vicinity of a measuring and evaluating device for determining the activity in each probe. The probes are moved in sequence by a control unit into operative proximity with the measuring and evaluating device. The control unit comprises an elastic wire in the tube blocking the probes and a moving device for controllably withdrawing the wire from the tube.

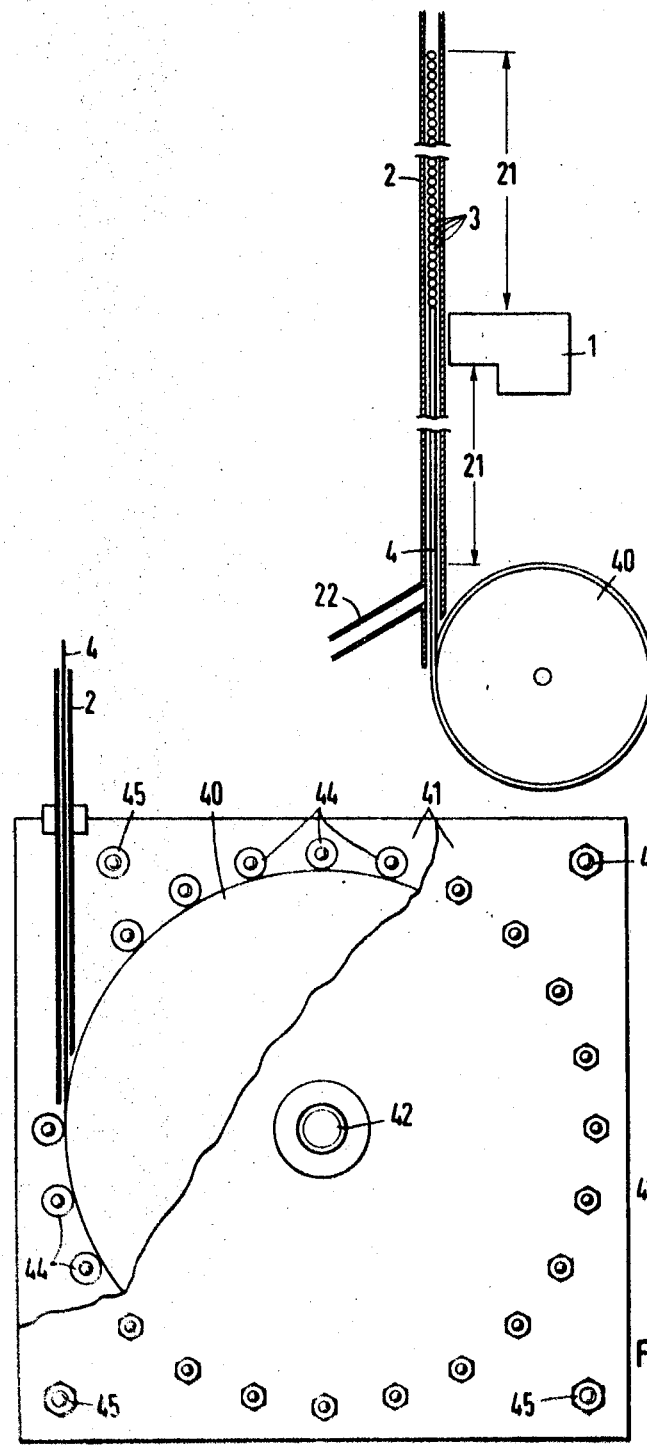

APPARATUS FOR MEASURING AND EVALUATING THE ACTIVITY OF MEASURING PROBES IRRADIATED IN A NUCLEAR REACTOR

Our invention relates to apparatus for measuring and evaluating the activity of measuring probes irradiated in a nuclear reactor. More particularly, our invention relates to apparatus for determining the flux density distribution of such probes.

Each of the measuring probes is of substantially spherical configuration and the probes are moved by compressed air or gas through a suitable conveyor. The measuring probes are irradiated in a nuclear core reactor installation and the object is to determine the flux density distribution of said probes. The probes are thus moved through tubes, ducts or pipes having a small diameter such as, for example, 2 mm. The probes are placed in the conveyor tube at determined points of the reactor installation and form a column of sequential array in the tube during their irradiation.

After the probes are irradiated, each probe must be tested, in proper sequence, to determine the activity therein. Compressed air or gas is utilized to move the probes through the tube from the positions in which they are irradiated in the reactor to positions adjacent or in operative proximity with a measuring and evaluating device. In order to properly determine the activity in each probe, it is important that each of the measuring probes be positioned in operative proximity with the measuring and evaluating device for the same period of time and that the distance of each probe from said device be maintained at a constant equal value.

The measuring and evaluating device could be moved along the sequentially positioned or aligned probes in the tube. This would create mechanical difficulties, however, since the length of the line of probes is approximately the height of the reactor core which may be, for example, 3—5 meters. Furthermore, considerable care must be taken that the measuring and evaluating device be maintained constantly at the same distance from the sequentially aligned probes, in order to maintain the accuracy of the determinations. The solution of such a problem, where the measuring and evaluating device is moved, entails considerable complications. The space utilized by such equipment would have to be shielded from radiation and would be of considerable volume.

The principal object of the present invention is to provide new and improved apparatus for measuring and evaluating the activity of measuring probes irradiated in a nuclear reactor.

An object of the present invention is to measure and evaluate the activity of measuring probes irradiated in a nuclear reactor by simple apparatus.

An object of the present invention is to provide apparatus for measuring and evaluating the activity of measuring probes irradiated in a nuclear reactor which maintains each of the probes at the same constant distance from the measuring and evaluating device for the same period of time.

An object of the present invention is to measure and evaluate the activity of measuring probes irradiated in a nuclear reactor with apparatus which occupies a minimum of space.

Another object of the present invention is to measure and evaluate the activity of measuring probes irradiated in a nuclear reactor with efficiency, effectiveness, reliability and accuracy.

In accordance with the present invention, apparatus for measuring and evaluating the activity probes irradiated in a nuclear reactor to determine the flux density distribution thereof comprises a measuring and evaluating device for determining the activity in an irradiated measuring probe. A conveyor tube in the vicinity of the measuring and evaluating means has a plurality of measuring probes sequentially positioned therein. A control unit moves the probes in sequence into operative proximity with the measuring and evaluating device. The control unit comprises an elastic wire in the tube blocking the probes and a moving device for controllably withdrawing the wire from the tube.

Each of the probes is of substantially spherical configuration. The moving device of the control unit comprises a drum rotatably mounted at an end of the conveyor tube and the wire is affixed to and wound around the drum. The drum has a substantially cylindrical peripheral surface with substantially helical grooves formed in the surface. The control unit further comprises a drum mounting which mounts the drum in a manner whereby it is rotatable about the axis thereof and movable in axial directions while the wire is wound around the drum and unwound from the drum so that the wire is always in a groove in the peripheral surface of the drum in alignment with the conveyor tube. A plurality of rollers spaced from each other around the peripheral surface of the drum constitute low-friction means for maintaining the wire wound on the drum in the grooves thereof.

In order that the present invention may be readily carried into effect, it will now be described with reference to the accompanying drawing, wherein:

FIG. 1 is a view, partly in section, of an embodiment of the apparatus of our invention for measuring and evaluating the activity of measuring probes irradiated in a nuclear reactor;

FIG. 2 is a view, partly in section and partly cut away, on an enlarged scale, of the control unit part of the apparatus of FIG. 1; and FIG. 3 is a view, partly in section, of the moving device of the control unit of FIG. 2.

In the FIGS., the same components are identified by the same reference numerals.

In FIG. 1 a conveyor tube 2 has a plurality of measuring probes 3 sequentially positioned therein and is positioned in the vicinity of a measuring and evaluating device 1. Each of the probes is of substantial spherical configuration and each has been irradiated in a nuclear reactor. The measuring and evaluating device 1 determines the activity in each irradiated measuring probe 3 as it passes in operative proximity with or adjacent to said measuring and evaluating device.

The conveyor tube 2 (FIG. 1) has a length 21 which corresponds to the maximum length of the sequentially aligned probes 3 therein. The conveyor tube 2 extends to a wire storage drum 40 of a control unit. The control unit also includes an elastic wire 4 in the tube 2 which blocks the probes 3 at its upper end and which is affixed to the drum 40 at its lower end.

The sequential linear array of probes 3 rests on the upper end of wire 4 (FIG. 1). The drum 40 functions as a moving device of the control unit for controllably withdrawing the wire 4 from the conveyor tube 2 by winding said wire around said drum. The drum 40 is rotated about its axis by any suitable driving device such as, for example, a motor (not shown in the FIGS.).

In the position of probes 3 shown in FIG. 1, said probes are not in operative proximity with the measuring and evaluating device 1, so that said device does not determine the activity thereof. When the probes 3 are to be measured and evaluated, however, as to their activity, the drum 40 is rotated at a uniform velocity about its axis and the wire 4 is withdrawn from the conveyor tube 2 by said drum at the same velocity due to the winding of said wire on said drum. The probes 3 then move downward with the wire 4, which supports them and blocks their exit from the conveyor tube 2, due to the force of gravity and compressed air or gas in said conveyor tube.

The sequentially aligned probes 3 remain supported by the upper end of the wire 4. The inner diameter of the conveyor tube 2 may have a magnitude of approximately 2 mm., for example, and each probe 3 may have a diameter of approximately 1.6 mm., for example. The diameter of the wire 4 may be the same or somewhat smaller than the diameter of each of the probes 3. The entire apparatus (FIG. 1) may be positioned within the concrete shield of the reactor and the drum 40 may be positioned outside said shield, since the wire 4 will not become activated.

FIGS. 2 and 3 disclose the control unit in greater detail. The wire 4, as it is withdrawn from the conveyor tube 2 and is wound around the drum 40, is maintained in position on the peripheral surface of the drum by a plurality of bearing rollers, roller bearings or rollers 44. The rollers 44 are spaced from each other at substantially equal distances around the periphery of the drum (FIG. 2). Each of the rollers 44 is mounted for low-friction rotation about its axis.

The wire 4, which has elastic properties, so that it may be wound on and unwound from the drum 40, may comprise steel, for example. The rollers 44 maintain the wire 4 in position on the periphery of the drum 40 even when said wire produces a shearing force in order to overcome great friction, for example. Since the rollers 44 prevent slippage of the wire 4 on the peripheral surface of the drum 40, said wire moves in exact correspondence with the rotational path of said drum.

The rollers 44 may be replaced by any other suitable low-friction devices which function to maintain the wire 4 in position on the peripheral surface of the drum 40. Thus, for example, a hollow cylinder may be coaxially positioned around the drum 40 and suitable lubrication may be provided between said drum and said cylinder so that said cylinder functions in the same manner as the rollers 44.

The drum 40 is mounted between a pair of spaced, substantially parallel housing plates 41 which are joined to each other by spacer bolts 45 (FIG. 2). The drum 40 has a cylindrical peripheral surface with substantially helical grooves 46 formed in said surface. The wire 4 is positioned in the grooves formed in the peripheral surface of the drum 40 as said wire is wound on said drum. This ensures exactly predetermined winding and unwinding processes of the wire. In order to provide exactness in the winding of the wire on the drum and the unwinding of the wire from the drum, between the conveyor tube 2 and the grooves 46 of said drum, said drum is mounted in a manner whereby it is rotatable about its axis and movable in axial directions while the wire is wound around it and unwound from it. This ensures that the wire 4 is always in a groove 46 in the peripheral surface of the drum 40 in alignment with the conveyor tube 2.

Suitable apparatus for mounting the drum may thus comprise an internally threaded bearing for a shaft 42 of said drum. A portion 43 of the shaft 42, which portion is seated in the bearing mounted on one of the housing plates 41, is externally threaded. The external threading on the shaft 42 is coupled with the internal threading of the bearing and both threads have the same pitch as the helical groove 46 of the drum 40. The drum 40 is rotated about its axis around its shaft 42 (FIGS. 2 and 3) by any suitable driving device, as previously mentioned, and not shown in the drawings. As shown in FIG. 2, the conveyor tube 2 is preferably positioned very close to the peripheral surface of the drum 40 to prevent distortion such as, for example, bending buckling, or the like, of the wire 4 in the distance between the closest roller 44 and the opening of said conveyor tube.

As the sequence of probes 3 moves downward in the conveyor tube 2, due to the winding of the wire 4 on the drum 40, each of said probes moves into operative proximity with the measuring and evaluating device 1 for the same period of time as the others and at the same distance from said device as the others. As each probe 3 is moved into operative proximity with the measuring and evaluating device 1, said device determines the activity thereof. After completion of the measurement and evaluation of the activity of all the probes 3, said probes are positioned, still in sequential alignment, below the device 1. The probes 3 are then conducted in any suitable manner such as, for example, by compressed air, into a conduit, duct, pipe, tube, or the like, 22 which branches off from the conveyor tube 2. The probes 3 in the tube 22 are then returned to their proper positions via said tube. When the conveyor tube 2 is devoid of probes 3, the wire 4 may be moved upward in said conveyor tube by being unwound from the drum 40 and may thus resume its initial position, as shown in FIG. 1.

Other suitable devices than the drum 40 may be utilized as the moving device. A suitable moving device may comprise, for example, a friction coupling including rotating rollers. This, however, would require considerably more space than the disclosed apparatus. Furthermore, such a device would create the possibility of slippage between the moving device and the wire 4, and such slippage must be and is specifically avoided in the apparatus of our invention.

While the invention has been described by means of a specific example and in a specific embodiment, we do not wish to be limited thereto, for obvious modifications will occur to those skilled in the art without departing from the spirit and scope of the invention.

We claim:

1. Apparatus for measuring and evaluating the activity of ball-shaped measuring probes moved by gas pressure in tubes and activated and irradiated in a nuclear reactor to determine the flux density distribution thereof, comprising stationary measuring and evaluating means for determining the activity in an irradiated measuring probe; a substantially vertical conveyor tube in the vicinity of said measuring and evaluating means having a plurality of measuring probes sequentially positioned therein one upon the other; and control means for moving said probes in sequence into operative proximity with said measuring and evaluating means, said control means comprising an elastic wire in said tube blocking said probes with said probes resting on and moving with said wire in said tube and moving and winding means for controllably withdrawing and winding said wire from said tube.

2. Apparatus as claimed in claim 1, wherein the moving means of said control means comprises a drum rotatably mounted at an end of said conveyor tube, said wire means being affixed to and wound around said drum.

3. Apparatus as claimed in claim 2, wherein said drum has a substantially cylindrical peripheral surface with substantially helical grooves formed in said surface, and wherein said control means further comprises a drum mount mounting said drum in a manner whereby said drum is rotatable about the axis thereof and movable in axial directions while said wire is wound around said drum and unwound from said drum, so that said wire is always in a groove in the peripheral surface of said drum in alignment with said conveyor tube.

4. Apparatus as claimed in claim 2, further comprising low-friction means mounted adjacent the peripheral surface of said drum for maintaining the wire wound thereon in position.

5. Apparatus as claimed in claim 3, further comprising low-friction means mounted adjacent the peripheral surface of said drum for maintaining the wire wound thereon in the grooves thereof.

6. Apparatus as claimed in claim 5, wherein said low-friction means comprises a plurality of rollers spaced from each other around the peripheral surface of said drum.